(12) United States Patent
Gustafsson et al.

(10) Patent No.: US 9,401,159 B2
(45) Date of Patent: *Jul. 26, 2016

(54) VOICE REMOTE CONTROL

(71) Applicant: SnapTrack, Inc., San Diego, CA (US)

(72) Inventors: Mats Gustafsson, Nacka (SE); Julian Charles Hope, Harwood (GB)

(73) Assignee: SNAPTRACK, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/190,385

(22) Filed: Feb. 26, 2014

(65) Prior Publication Data

US 2014/0195250 A1 Jul. 10, 2014

Related U.S. Application Data

(63) Continuation of application No. 13/468,431, filed on May 10, 2012, now Pat. No. 8,674,939, which is a continuation of application No. 11/427,807, filed on Jun. 30, 2006, now Pat. No. 8,207,936.

(51) Int. Cl.
*G10L 21/16* (2013.01)
*H04N 5/232* (2006.01)

(52) U.S. Cl.
CPC ............ *G10L 21/16* (2013.01); *H04N 5/23203* (2013.01)

(58) Field of Classification Search
CPC .... G06F 3/0482; G06F 3/0483; G06F 3/0484
USPC ......................................................... 345/173
See application file for complete search history.

(56) References Cited

U.S. PATENT DOCUMENTS

| 4,389,109 A | 6/1983 | Taniguchi et al. |
| 5,027,149 A | 6/1991 | Hoshino et al. |
| 5,749,000 A | 5/1998 | Narisawa |
| 5,893,902 A | 4/1999 | Transue et al. |
| 6,289,140 B1 | 9/2001 | Oliver |
| 6,295,391 B1 * | 9/2001 | Rudd et al. ..................... 382/313 |
| 7,538,711 B2 | 5/2009 | Chung et al. |
| 8,207,936 B2 | 6/2012 | Gustafsson et al. |
| 8,674,939 B2 * | 3/2014 | Gustafsson et al. .......... 345/156 |
| 2005/0118990 A1 * | 6/2005 | Stephens ....................... 455/418 |

FOREIGN PATENT DOCUMENTS

| EP | 1014338 A1 | 6/2000 |
| JP | H11109498 A | 4/1999 |

(Continued)

OTHER PUBLICATIONS

International Search Report and Written Opinion dated Apr. 20, 2007, issued in corresponding PCT Application No. PCT/IB2006/055039, 9 pages.

*Primary Examiner* — Kenneth B Lee, Jr.
(74) *Attorney, Agent, or Firm* — Foley & Lardner LLP

(57) ABSTRACT

A device may include a display and logic. The logic may be configured to receive a selection of a first control action associated with an application stored in the device, provide a number of choices associated with the first control action, and receive a word or a phrase to use as a voice command corresponding to the first control action, wherein the word or phrase is selected from the choices. The logic may also associate the word or phrase with the first control action, receive voice input from a user, identify the voice input as corresponding to the word or phrase, and perform the first control action based on the identified voice input.

28 Claims, 6 Drawing Sheets

(56) References Cited

FOREIGN PATENT DOCUMENTS

| JP | 2001216059 A | 8/2001 |
| JP | 2002312386 A | 10/2002 |
| JP | 2005027002 A | 1/2005 |
| KR | 20060070993 A | 6/2006 |

\* cited by examiner

| ACTION 510 | VOICE COMMAND 520 |
|---|---|
| TURN ON/OFF CAMERA | CAMERA ON/OFF |
| TURN ON/OFF MICROPHONE | MICROPHONE ON/OFF |
| TAKE PICTURE | CHEESE |
| USE FLASH WITH PICTURE | FLASH |
| TAKE "N" PICTURES IN QUICK SUCCESSION | BURST "N" |
| ZOOM IN/OUT PREDETERMINED AMOUNT | ZOOM IN/OUT |
| ZOOM OUT MAX | WIDE ANGLE |
| TURN ON/OFF NORMAL AUTO FOCUS | FOCUS ON/OFF |
| TURN ON AUTO FOCUS MACRO MODE | AUTO FOCUS MACRO |
| START/STOP VIDEO CAPTURE | VIDEO START/STOP |
| USE MAXIMUM RESOLUTION | MAX RESOLUTION |

VOICE REMOTE CONTROL

CROSS REFERENCE TO RELATED APPLICATIONS

This application is a continuation of U.S. patent application Ser. No. 13/468,431, filed May 10, 2012, which is a continuation of U.S. patent application Ser. No. 11/427,807, filed Jun. 30, 2006, now U.S. Pat. No. 8,207,936, the disclosures of which are all hereby incorporated herein by reference in their entireties.

TECHNICAL FIELD OF THE INVENTION

The invention relates generally to performing control actions and, more particularly, to performing image capture-related control actions using speech recognition.

DESCRIPTION OF RELATED ART

Communication devices, such as cellular telephones, have become increasingly versatile. For example, cellular telephones today often include applications that allow users to do more than just make and receive telephone calls, such as send/receive text messages, play music, play video games, etc. In addition, cellular telephones often include cameras that allow users to take pictures and record video clips. As a result, cellular telephones have become an increasingly common part of every day life.

SUMMARY

According to one aspect, a device comprising at least one image capturing device and logic is provided. The logic is configured to receive voice input from a user, identify the voice input and perform a control action associated with the at least one image capturing device based on the identified voice input.

Additionally, the at least one image capturing device may comprise a camera and the control action comprises taking a picture using the camera.

Additionally, the at least one image capturing device may comprise a video recording device and the control action comprises activating a video recording mode associated with the video recording device.

Additionally, the control action may comprise controlling an auto focus function, controlling a zoom lens or controlling a resolution mode.

Additionally, when identifying the voice input, the logic is configured to identify the voice input using speech recognition software.

Additionally, the device may further comprise a display configured to display, in response to a user input, a plurality of control actions and voice commands associated with each of the plurality of control actions.

Additionally, the device may comprise a memory and the logic may be further configured to allow a user to provide at least one word corresponding to each of a plurality of respective control actions. The logic may further be configured to store the at least one word corresponding to each of the plurality of respective control actions in the memory.

Additionally, the logic may be further configured to perform speech recognition to identify a first word or phrase associated with a first one of the plurality of control actions, verify with the user whether the identified first word or phrase is correct and store the identified first word or phrase as corresponding to the first control action in the memory when the identified first word or phrase is verified as correct.

Additionally, the device may further comprise a memory and the logic may be further configured to provide a user interface configured to allow the user to input text to the device, the text identifying at least one word or phrase that will correspond to a first control action associated with the at least one image capturing device and store the text in the memory as corresponding to the first control action.

Additionally, the device may comprise a cellular telephone.

According to another aspect, a method is performed in a mobile terminal that includes at least one image capturing device. The method includes receiving voice input from a user, identifying the voice input and performing a control action associated with the at least one image capturing device based on the identified voice input.

Additionally, the control action may comprise at least one of taking a picture, activating a video record mode, setting a resolution mode, activating a flash, controlling a zoom lens or controlling an auto focus function.

Additionally, the identifying the voice input comprises identifying the voice input using speech recognition software.

Additionally, the identifying the voice input using speech recognition software comprises comparing the voice input to a plurality of stored speech signals provided by the user and determining whether the voice input matches one of the stored speech signals.

Additionally, the method may further comprise prompting the user to provide a voice input associated with each of a plurality of respective control actions, receiving at least one word from the user associated with each of the plurality of respective control actions in response to the prompting and storing the at least one word associated with each of the plurality of respective control actions.

Additionally, the method may further comprise performing speech recognition to identify at least a first word associated with a first one of the plurality of control actions, verifying with the user whether the identified first word associated with the first control action is correct and storing the first word associated with the first control action when the identified first word is verified as correct.

According to still another aspect, a device is provided. The device comprises means for taking at least one of pictures or videos, means for receiving a voice input from the user and means for performing a control action associated with the means for taking at least one of pictures or videos based on the voice input.

Additionally, the device may comprise means for displaying a plurality of control actions and a plurality of voice commands corresponding to the plurality of control actions.

According to yet another aspect, a computer-readable medium having stored thereon a plurality of instructions is provided. The instructions, when executed by at least one processor, cause the at least one processor to receive a voice input from a user, identify the voice input and perform an image capture-related control function based on the identified voice input.

Additionally, the image capture-related control function may comprise at least one of taking a picture with a camera, activating a video record mode associated with a video recording device, setting a resolution mode, activating a flash, controlling a zoom lens or controlling an auto focus function.

Additionally, the instructions further cause the processor to display, in response to a user input, a plurality of image capture-related control actions and voice commands corresponding to each of the plurality of image capture-related control actions.

Additionally, the instructions further cause the processor to allow a user to select a word or phrase corresponding to each of a plurality of image capture-related control actions.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

FIG. 5 is a diagram of an exemplary table that may be stored in the mobile terminal of FIG. 2 and/or displayed to a user.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1A:
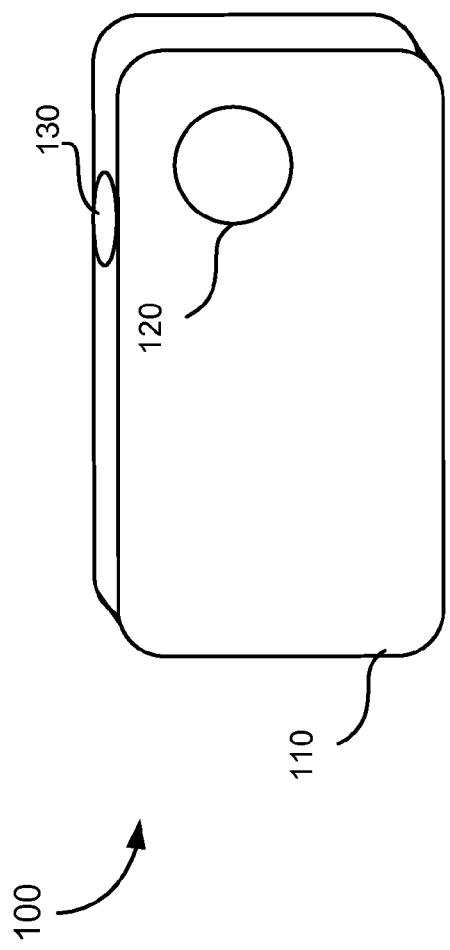
FIGS. 1A and 1B are diagrams of an exemplary mobile terminal in which methods and systems consistent with the invention may be implemented.
Figure 1B:
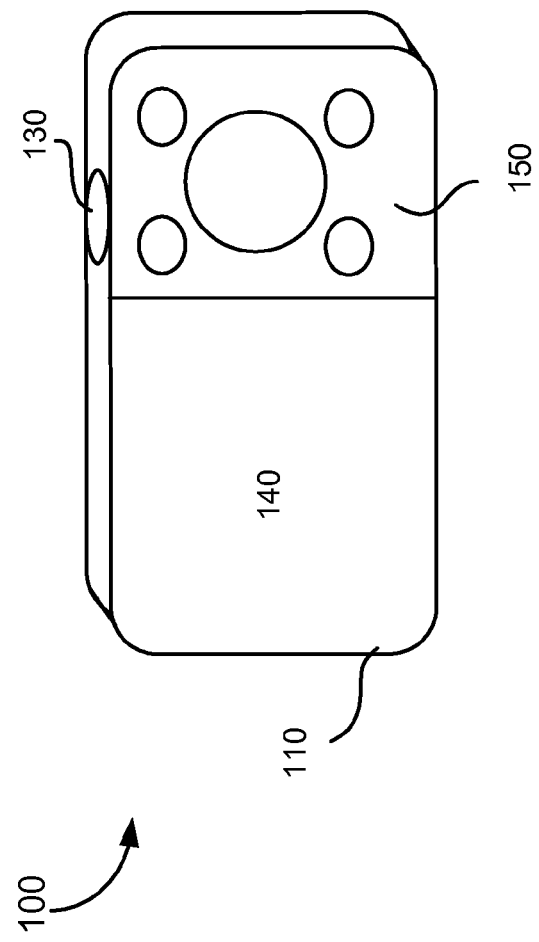

FIGS. 1A and 1B are front side and back side views of an exemplary mobile terminal 100 in which systems and methods consistent with the invention may be implemented. The invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. It should also be understood that aspects of the invention may also be implemented in other devices that do not include communication functionality associated with making and receiving telephone calls. For example, aspects of the invention may be implemented in any image capturing device. The term "image capturing device", as used herein, may include any device that captures still images, such as a camera, and/or moving images, such as a video recording device.

Referring to FIG. 1A, mobile terminal 100 may include housing 110, lens 120 and shutter button 130. Housing 110 may protect the components of mobile terminal 100 from outside elements. Lens 120 may focus light and may include a number of lens elements. A lens cover (not shown) may be controlled to uncover lens 120 to permit the user to take pictures and cover lens 120 when the camera is not in use. Shutter button 130 may be pressed by a user to take a picture.

FIG. 1B illustrates the back side of mobile terminal 100. Referring to FIG. 1B, mobile terminal 100 includes display screen 140 and user control area 150. Display screen 140 may be a liquid crystal display (LCD) or some other type of display screen that allows the user to view images that will be captured when the user takes a picture and/or records a video clip. In some implementations, lens 120 may be located on the same side of mobile terminal 100 as display screen 140. Mobile terminal 100 may also include other elements/components (not shown) associated with taking pictures and/or recording video clips. For example, mobile terminal 100 may include a zoom lens, a flash, and other elements that facilitate taking pictures and/or videos.

User control area 150 may include controls associated with placing telephone calls via mobile terminal 100. For example, user control area 150 may include a dial button, hang up button, etc. User control area 150 may also include a menu button that permits the user to view a menu associated with selecting functions, such as a voice activated remote control function for mobile terminal 100, as described in detail below.

Figure 2:
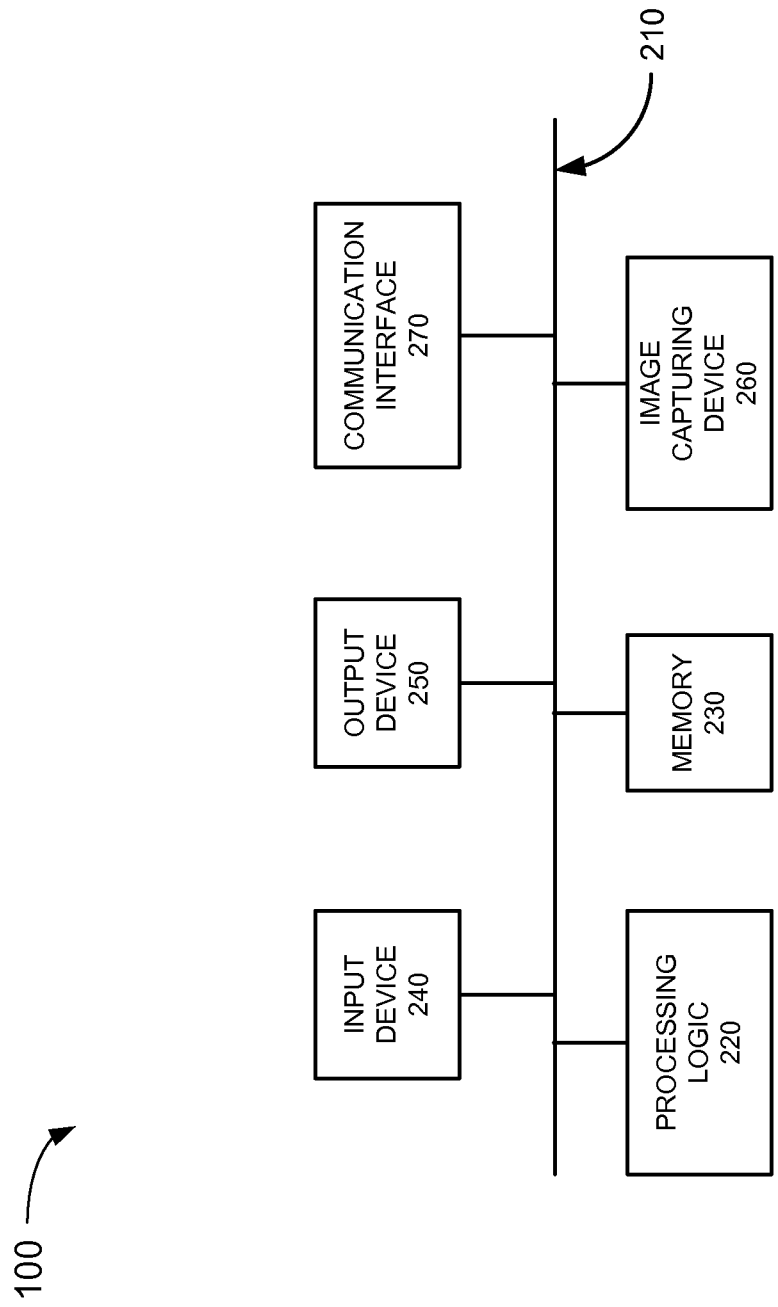
FIG. 2 is an exemplary block diagram of the mobile terminal of FIGS. 1A and 1B according to an implementation consistent with the invention.

FIG. 2 is a diagram of mobile terminal 100 according to an exemplary implementation consistent with the invention. Mobile terminal 100 may include bus 210, processing logic 220, memory 230, input device 240, output device 250, image capturing device 260 and communication interface 270. Bus 210 permits communication among the components of mobile terminal 100. One skilled in the art would recognize that mobile terminal 100 may be configured in a number of other ways and may include other or different elements. For example, mobile terminal 100 may include one or more power supplies (not shown). Mobile terminal 100 may also include a modulator, a demodulator, an encoder, a decoder, etc., for processing data.

Processing logic 220 may include a processor, microprocessor, an application specific integrated circuit (ASIC), field programmable gate array (FPGA) or the like. Processing logic 220 may execute software instructions/programs or data structures to control operation of mobile terminal 100.

Memory 230 may include a random access memory (RAM) or another type of dynamic storage device that stores information and instructions for execution by processing logic 220; a read only memory (ROM) or another type of static storage device that stores static information and instructions for use by processing logic 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processing logic 220. Instructions used by processing logic 220 may also, or alternatively, be stored in another type of computer-readable medium accessible by processing logic 220

Input device 240 may include any mechanism that permits an operator to input information to mobile terminal 100, such as a microphone, a keyboard, a keypad, a mouse, a pen, voice recognition and/or biometric mechanisms, etc. Input device 240 may also include one or more buttons, such as a button in user control area 150 (FIG. 1B), that allows a user to receive a menu of options via output device 250. The menu may allow the user to select various functions or modes associated with applications executed by mobile terminal 100. Alternatively, input device 240 may include one or more buttons in control area 150 that allows a user to activate a particular mode for mobile terminal 100, such as a mode associated with activating a voice activated remote control function associated with the camera 260.

Output device 250 may include one or more conventional mechanisms that output information to the user, including a display, a printer, one or more speakers, etc. Output device 250 may also include a vibration mechanism that causes mobile terminal 100 to vibrate when an incoming call is received.

Image capturing device 260 may include conventional camera elements, such as lens 120, shutter button 130 and other components, that enable mobile terminal 100 to take pictures. Image capturing device 260 may also include components that enable image capturing device 260 to record moving images, such as video clips. Image capturing device 260 may store the pictures/video clips in, for example, memory 230 or in another memory. Image capturing device 260, as discussed above, may also include other elements, such as a zoom lens, a flash etc. Image capturing device 260 may further operate in one of two modes. In the first mode, the user of mobile terminal 100 may take pictures by pressing shutter button 130, operate a zoom lens manually and/or switch to a video mode by pressing one or more buttons on mobile terminal 100. In a second mode, the user of mobile terminal 100 may take pictures/videos via image capturing device 260 using voice commands, as described in more detail below. Image capturing device 260 is shown as a single device in FIG. 2. In some implementations, image capturing device 260 may include separate camera related elements/components for taking still pictures and separate video recording related elements/components for taking and recording moving images (e.g., videos).

Communication interface 270 may include any transceiver-like mechanism that enables mobile terminal 100 to communicate with other devices and/or systems. For example, communication interface 270 may include a modem or an Ethernet interface to a LAN.

Communication interface 270 may also include other mechanisms for communicating via a network, such as a wireless network. For example, communication interface 270 may include one or more radio frequency (RF) transmitters and receivers and/or transceivers for transmitting RF data. Communication interface 270 may also include one or more antennas for transmitting/receiving data, such as RF data.

Mobile terminal 100, consistent with the invention, may perform processing associated with controlling various elements on mobile terminal 100, such as image capturing logic 260. Mobile terminal 100 may perform these operations in response to processing logic 220 executing sequences of instructions contained in a computer-readable medium, such as memory 230. Such instructions may be read into memory 230 from another computer-readable medium via, for example, communication interface 270. A computer-readable medium may include one or more memory devices and/or carrier waves. In alternative embodiments, hard-wired circuitry may be used in place of or in combination with software instructions to implement processes consistent with the invention. Thus, implementations consistent with the invention are not limited to any specific combination of hardware circuitry and software.

Figure 3:
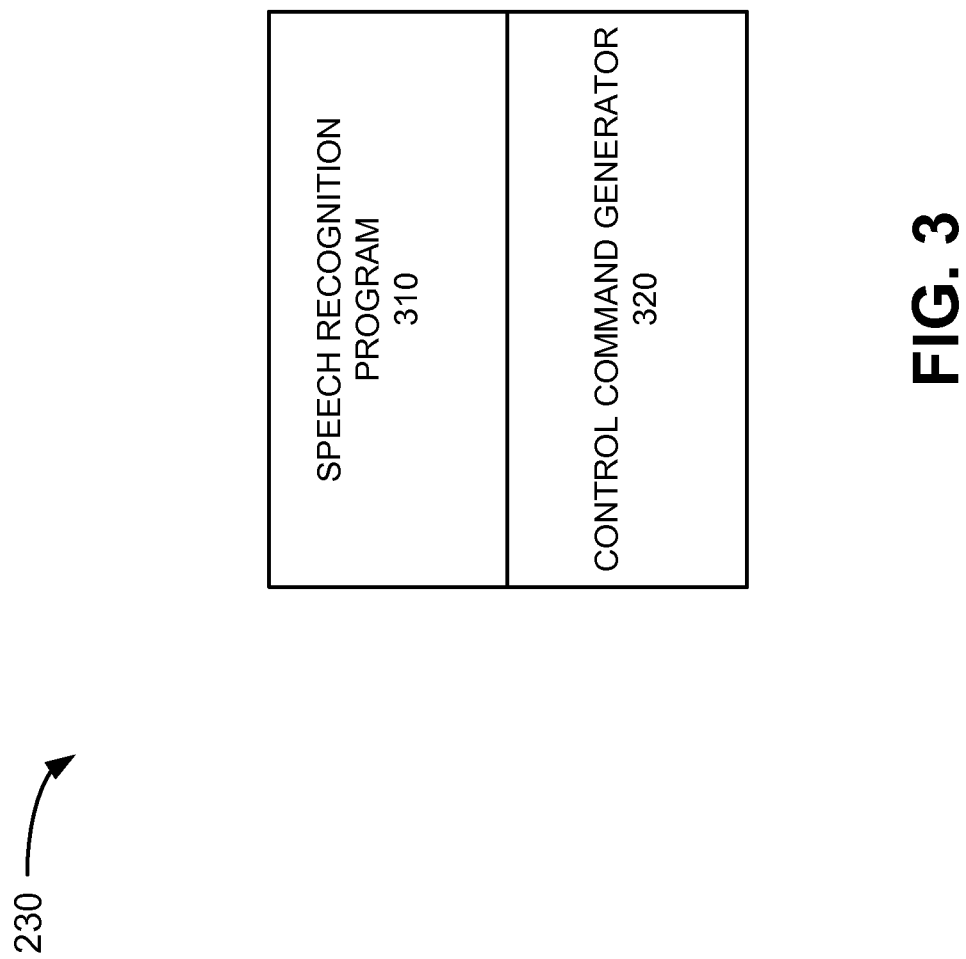
FIG. 3 is an exemplary functional block diagram of components implemented in the mobile terminal of FIG. 2 according to an implementation consistent with the invention.

FIG. 3 is a functional block diagram of exemplary components implemented in mobile terminal 100 of FIG. 2, such as in memory 230, according to an implementation consistent with the invention. Referring to FIG. 3, memory 230 may include speech recognition program 310 and control command generator 320. Speech recognition program 310 may include any type of speech recognition software and/or hardware that can perform speech recognition to identify various words and/or phrases and output information based on the recognized word/phrase. Speech recognition program 310 may also include a user interface in which a user of mobile terminal 100 is prompted to provide words/phrases that will be correlated to various actions, as described in more detail below. Speech recognition program 310 may further include a rules database that stores a number of rules or grammars associated with performing speech recognition. These rules/grammars may be based on the particular words/phrases that speech recognition program 310 is configured to recognize.

For example, speech recognition program 310 may be configured to recognize various words, such as "cheese", "click", "take picture", "zoom in", "wide angle", "focus", "auto focus normal", "auto focus macro", "auto focus off", "burst 4", "video start", "video stop", "flash", "high resolution", "low resolution", "microphone on", "microphone off", and other words/phrases associated with taking pictures and/or videos with image capturing device 260. These words/phrases may be provided by a user of mobile terminal 100, correlated to various control actions and stored in mobile terminal 100, as described in more detail below. Speech recognition program 310 may use these stored words/phrases to facilitate accurate speech recognition.

Speech recognition program 310 may also store speech samples, such as words/phrases input by a user of mobile terminal 100 that the user would like to correlate to various control actions. Speech recognition program 310 may also use these stored speech samples to facilitate the speech recognition process. For example, speech recognition program 310 may compare a word or phrase input by a user to the stored speech samples. If the received word or phrase matches one of the stored speech samples, speech recognition program 310 may identify the word/phrase associated with the stored speech sample as being the word/phrase voiced by the user. Using stored speech samples may help enhance the accuracy of the speech recognition process.

In each case, speech recognition program 310 may receive a voice input and determine whether the voice input corresponds to one of the words/phrases stored in speech recognition program 310. Speech recognition program 310 may then forward information identifying the spoken word/phrase to other devices/applications in mobile terminal 100, such as control command generator 320.

Control command generator 320 may receive information from speech recognition program 310 and generate commands to control an application executed by mobile terminal 100. For example, in one implementation, control command generator 320 may be configured to perform control actions associated with taking pictures and/or videos by image capturing device 260 and/or peripheral devices associated with image capturing device 260, such as a zoom lens or a flash. In each case, control command generator 320 may include pre-stored commands/codes and/or generate commands, codes or instructions that are appropriate for the desired control action.

Figure 4:
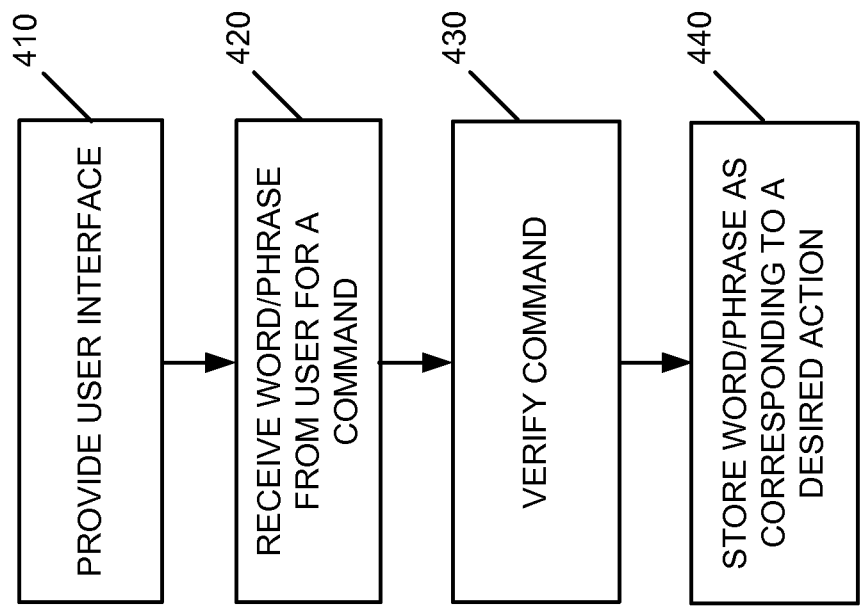
FIG. 4 is a flow diagram illustrating exemplary processing associated with configuring the mobile terminal of FIG. 2 consistent with the invention.

As described above, in some implementations, speech recognition program 310 may include a user interface that allows a user to provide various words/phrases that will be correlated to various control commands. For example, FIG. 4 illustrates exemplary processing associated with providing customized voice commands that will be used by speech recognition program 310 and/or control command generator 320 to perform various control actions. Processing may begin with a user accessing a menu provided via, for example, output device 250 of mobile terminal 100. The menu may include an option for allowing the user to input various voice commands that will be recognized by speech recognition program 310. Assume that the user selects this option.

Speech recognition program 310 may then provide a user interface to the user of mobile terminal 100 (act 410). In an exemplary implementation, the user interface may display a number of commands to the user via display screen 140, such as take a picture, zoom in, zoom out, auto focus, activate the flash when taking a picture, go to video mode, use high resolution mode, use low resolution mode, turn on the camera, turn off the camera, turn on a microphone, turn off the microphone, etc.

Assume that the user selects the command for taking a picture. In this case, the user interface may prompt the user to voice a word or phrase that he/she would like to correspond to a command for taking a picture using image capturing device 260. The prompt provided by speech recognition program 310 may be a voice prompt output to the user via output device 250 (e.g., a speaker) and/or a text prompt output via display screen 140.

Assume that the user would like to have the word "cheese" correspond to the voice command for taking a picture. In this case, the user may voice the word "cheese". Speech recognition program 310 may receive the voice input via, for example, input device 240 (e.g., a microphone) (act 420). Speech recognition program 310 may voice the word "cheese" back to the user to ensure that the word is correctly identified by speech recognition program 310.

For example, speech recognition program 310 may provide a voice output such as, "You have selected the word cheese as the command for taking a picture. Is that correct?" If the speech recognition program 310 has properly identified the word/phrase (cheese in this example), the user may confirm the word/phrase identified by speech recognition program 310, such as by answering yes (act 430).

Alternatively, the prompt provided by speech recognition program 310 may indicate that the user is to enter the word/phrase via text input, such as via input device 240 (e.g., an alphanumeric keypad).

In each case, speech recognition program 310 will store the word/phrase provided by the user and correlate the word/phrase to a command for taking a picture (act 440). Processing may continue in this manner for a number of other commands/actions. That is, the user may provide words/phrases for zooming in a predetermined amount, zooming in a maximum amount, zooming out a predetermined amount, zooming out a maximum amount, using an auto focus function, taking a number of pictures quickly in succession, using a flash when taking a picture, starting a video capture mode, stopping a video capture mode, activating a high resolution mode associated with taking/storing a picture, activating a low resolution mode associated with taking/storing a picture, turning on the camera, turning off the camera, turning on a microphone, turning off the microphone, etc. In each case, the user may select his/her preferred word or phrase for performing the desired action.

For example, as discussed above, the word/phrase, may be a single word, such as cheese for taking a picture, "video" for enabling image capturing device 260 to operate in a video record mode, etc. Alternatively, the word/phrase may be a number of words, such as "max zoom" for using the zoom lens to zoom in on a subject, "high resolution" to direct image capturing device 260 to take and store a digital picture using the highest number of mega pixels available via camera 260, "burst 4" to direct image capturing device 260 to take four pictures in very quick succession, etc. In this manner, the user's preferred voice commands may be stored by mobile terminal 100 and correlated to the desired control actions.

At a later time after the initial commands are provided by the user, the user may view the list of words/phrases and corresponding commands that mobile terminal 100 has stored. For example, mobile terminal 100 may include a menu that allows a user to view the voice commands stored in mobile terminal 100. The user may view the commands by, for example, pressing a button in user control area 150 (FIG. 1B). In response to the selection by the user, mobile terminal 100 may output the list of commands and corresponding voice inputs via display screen 140.

For example, FIG. 5 illustrates an exemplary table stored in mobile terminal 100 and/or displayed to a user via display screen 140. Referring to FIG. 5, table 500 may include a list of control actions in field 510 and a list of corresponding voice commands in field 520. For example, the voice command for turning the camera on may by "camera on," as illustrated in the first entry. If the user wishes to change a voice command, the user may select the particular command via an input device, such as a keypad control device and provide the new command. For example, if the user wishes to change the command for taking a picture from "cheese" to "click", the user may select the action "take picture" in field 510 or the voice command "cheese" in field 520 and provide a new word/phrase to replace "cheese". In this example, the user would voice "click" (or input "click" via an alphanumeric keypad) and speech recognition program 310 would replace "cheese" with "click" and would recognize "click" as being the voice command for taking a picture. In this manner, the user may change the particular voice command for a particular control action at any time.

In some implementations, speech recognition program 310 may store a menu of choices (i.e., words/phrases) that may be used for each particular control action. In this case, speech recognition program 310 may display the choices for a particular control action and the user may select one of the choices that he/she wishes to use for a particular control action. The user may then use the selected word/phrase as a voice command for performing the desired control action.

In addition, in some implementations, default voice commands may be pre-stored by voice recognition program 310. That is, voice recognition program 310 may store various voice commands for particular actions prior to the user inputting any particular words/phrases. In this case, the user may view the voice commands and decide whether to use the pre-stored words/phrases or make one or more changes to the pre-stored words/phrases that correspond to the voice commands. In each case, voice recognition program 310 may allow the user to select his/her preferred words/phrases for performing various control actions. Mobile terminal 100 may then perform the desired control actions in response to the voice input, as described in detail below.

Figure 6:
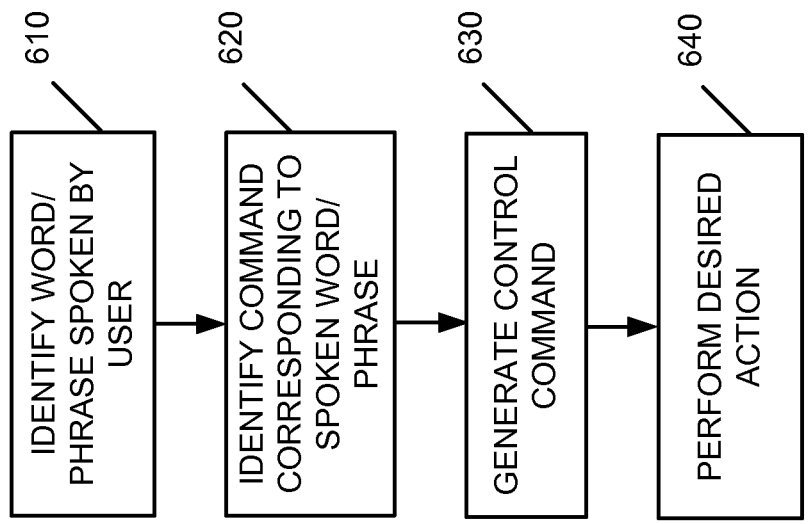
FIG. 6 is a flow diagram illustrating exemplary processing consistent with the invention.

FIG. 6 is a flow diagram illustrating exemplary processing associated with performing a control action associated with image capturing device 260. Assume that mobile terminal 100 is powered up and that the user of mobile terminal 100 wishes to take a picture using image capturing device 260. For example, the user of mobile terminal 100 may want to take a picture of himself/herself with a group of friends using image capturing device 260. In this case, the user of mobile terminal 100 may place mobile terminal 100 on some surface, such as a table, arrange the group of friends around himself/herself in front of lens 120 and voice the word "cheese".

Speech recognition program 310 may receive the voice input and perform speech recognition to identify the particular word/phrase voiced by the user (act 610). In this case, assume that the speech recognition program identifies the word "cheese." Speech recognition program 310 may then identify the command corresponding to the spoken word/phrase (i.e., cheese in this example) (act 620). For example, speech recognition program 310 may access table 500 and identify that the word "cheese" corresponds to the control action 510 for taking a picture.

Speech recognition program 310 may forward the identified command to control command generator 320. Control command generator 320 receives the information from speech recognition program 310 and generates the appropriate command or instruction to cause image capturing device 260 to take a picture (act 630). For example, control command generator 320 may instruct image capturing device 260 to take a picture. This instruction may replace the conventional signal received when shutter button 130 is pressed. Image capturing device 260 may then take the picture (act 640). In this manner, the user of mobile terminal 100 may simply voice a command for taking a picture and mobile terminal 100 may perform the control actions required to take the picture. This enables the user to perform various control actions associated with image capturing device 260 without requiring the user to press shutter button 130 or one or more other buttons to perform the desired action. Advantageously, using speech recognition program 310 in this manner may allow the user to place himself/herself in a picture without requiring the user to set a timing device and then rush to set himself/herself in the picture. In addition, using speech recognition program 310 may allow the user to avoid inadvertently moving mobile terminal 100 when pressing a shutter button, thereby avoiding pictures that may be out of focus or improperly centered.

Control command generator 320, as discussed above, may also generate commands or instructions that control other components associated with image capturing device 260, such as a zoom lens, an auto focus function, a flash, etc. In each case, control command generator 320 may be configured to store commands, codes and/or instructions that are recognized by various components associated with image capturing device 260 to perform the desired control function.

As another example, assume that the user associated with mobile terminal 100 wants to switch to a video record mode, the user may simply voice "video start" and image capturing device 260 will switch to a video recording mode in which a video clip (e.g., moving images) may be recorded. Using speech recognition program 310 in this manner may provide additional benefits when the user is busy concentrating on a particular subject. For example, while the user is following action in a sporting event, the user may simply voice a command to switch to a video mode without having to look up and press one or more buttons on mobile terminal 100.

As still another example, assume that the user of mobile terminal 100 wants to take pictures using the highest resolution mode available via image capturing device 260. In this case, the user may voice "max resolution" and the image capturing device 260 will take pictures using the highest mega pixel resolution available via image capturing device 260. Again, using speech recognition program 310 in this manner enables the user to concentrate on a subject that he/she wants to capture via a picture without requiring the user to press one or more buttons to change a picture resolution mode associated with image capturing device 260.

In still another situation, the user of mobile terminal 100 may wish to take a number of pictures, such as four pictures, in quick succession. In this case, the user may voice "burst 4" and the image capturing device 260 may take four pictures in very quick succession. This command may advantageously allow the user to capture images more quickly than by pressing shutter button 130.

As described above, mobile terminal 100 may use voice recognition to perform various control actions associated with image capturing device 260. In some implementations, mobile terminal 100 may include a mode designator that allows image capturing device 260 and other components associated with image capturing device 260 to be controlled via voice commands. For example, mobile terminal 100 may include a menu that allows the user of mobile terminal 100 to designate that image capturing device 260 is to be used in a voice activation control mode, as opposed to in a conventional manual activation mode. The user may receive the menu by, for example, pressing a button in user control area 150 (FIG. 1B). Alternatively, input device 240 may include a camera/video button located in user control area 150 that allows a user to select whether image capturing device 260 is in a mode associated with voice commands or in a conventional camera/video record mode. In still other alternatives, no voice activation mode associated with image capturing device 260 may need to be set. That is, image capturing device 260 may operate in a voice activation mode without requiring any particular mode to be set. For example, in one implementation, the user of mobile terminal 100 may simply voice "microphone on" to activate a microphone that may be included in input device 240. Once the microphone is activated, speech recognition program 310 may receive voice commands from the user. In each case, mobile terminal 100 may allow the user to provide voice commands that will result in one or more actions associated with image capturing device 260.

CONCLUSION

Implementations consistent with the invention allow a user to perform control actions associated with image capturing functionality in an efficient manner by using speech recognition. Advantageously, using speech recognition may allow the user to perform various control functions associated with a camera and/or a video recording device in a simple, user-friendly manner. This may increase the user's satisfaction with using various image capturing related functions and may simplify the overall use of these functions.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, the invention has been mainly described in the context of a mobile terminal that includes an image capturing device, such as a camera and/or a video recorder. The invention, however, may be used in other devices that include image capturing devices, such as a standalone camera, a standalone video recording device, a combination camera/video recording device, etc.

In addition, in some implementations, mobile terminal 100 may provide feedback, such as audio and/or text, to the user of mobile terminal 100 after a voice command is identified. For example, after the user has voiced a command for switching to a video mode, mobile terminal 100 may output audio stating "video mode activated". In this manner, the user may receive feedback indicating the particular control action performed.

Further, while a series of acts has been described with respect to FIGS. 4 and 6, the order of the acts may be varied in other implementations consistent with the invention. Moreover, non-dependent acts may be performed in parallel.

It will also be apparent to one of ordinary skill in the art that aspects of the invention, as described above, may be implemented in cellular communication devices/systems, methods, and/or computer program products. Accordingly, the invention may be embodied in hardware and/or in software (including firmware, resident software, micro-code, etc.). Furthermore, aspects consistent with the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A device, comprising:
a display; and
logic configured to:
receive a selection of a first control action associated with an application stored in the device,
provide a plurality of choices associated with the first control action,
receive a word or a phrase to use as a voice command corresponding to the first control action, wherein the word or phrase is selected from the plurality of choices,
associate the word or phrase with the first control action,
receive voice input from a user,
identify the voice input as corresponding to the word or phrase, and
perform the first control action based on the identified voice input.

2. The device of claim 1, further comprising:
a memory, and
wherein the logic is further configured to:
store the received word or phrase in the memory.

3. The device of claim 1, wherein the display is configured to:
display, in response to an input from the user, a plurality of control actions associated with the application and voice commands associated with the plurality of control actions.

4. The device of claim 3, wherein the logic is further configured to:
allow the user to change voice commands associated with at least some of the plurality of control actions.

5. The device of claim 4, wherein the logic is further configured to:
receive, from the user, a second selection corresponding to the first control action,
receive, from the user, a voice input identifying a new word or phrase that will be used as a voice command corresponding to the first control action, and
associate the new word or phrase with the first control action.

6. The device of claim 1, further comprising:
a memory, and
wherein the logic is further configured to:
allow the user to provide at least one word corresponding to each of a plurality of control actions associated with the application, and
store the at least one word corresponding to each of the plurality of respective control actions in the memory.

7. The device of claim 6, wherein the logic is further configured to:
perform speech recognition to identify a second word or phrase, provided by the user, that is associated with a second one of the plurality of control actions,
verify with the user whether the identified second word or phrase is correct, and
store the identified second word or phrase in the memory as corresponding to the second control action in response to verifying that the identified second word or phrase is correct.

8. The device of claim 1, further comprising:
a memory, and
wherein the logic is further configured to:
provide a user interface configured to allow the user to input text to the device, the text identifying at least one word or phrase that will correspond to a second control action associated with the application, and
store the text in the memory as corresponding to the second control action.

9. The device of claim 1, wherein the device comprises a mobile telephone.

10. The device of claim 1, wherein the device further comprises at least one of an image capturing device or a video recording device, and the first control action comprises at least one of taking a picture using the image capturing device, activating a video record mode associated with the video recording device, activating a flash, controlling an auto focus function, controlling a zoom lens or controlling a resolution mode.

11. In a mobile terminal, a method comprising:
receiving a selection of a first control action associated with a first application stored in the mobile terminal;
providing a plurality of choices associated with the first control action;

receiving input that identifies a word or a phrase to be used as a voice command corresponding to the first control action, wherein the word or phrase is selected from the plurality of choices;

associating the identified word or phrase as corresponding to the first control action;

receiving voice input from a user;

identifying the voice input as corresponding to the identified word or phrase; and performing the first control action associated with the first application based on the identified voice input.

12. The method of claim 11, wherein the first application is associated with a camera included in the mobile terminal and the first control action comprises at least one of taking a picture, activating a video record mode, setting a resolution mode, activating a flash, controlling a zoom lens or controlling an auto focus function.

13. The method of claim 11, further comprising:

prompting the user to provide a voice input associated with each of a plurality of control actions associated with the first application;

receiving at least one word, from the user, associated with each of the plurality of respective control actions in response to the prompting; and storing the at least one word associated with each of the plurality of respective control actions.

14. The method of claim 11, further comprising:

displaying, in response to an input from the user, a plurality of control actions associated with the first application and voice commands associated with the plurality of control actions.

15. The method of claim 14, further comprising:

receiving, from the user, a selection corresponding to the first control action;

receiving, from the user, a voice input identifying a new word or phrase that will be used as the voice command corresponding to the first control action; and associating the new word or phrase with the first control action.

16. The method of claim 11, further comprising:

receiving, from the user via a voice input, a second word or phrase corresponding to a second control action associated with the first application;

associating the second word or phrase with the second control action;

performing speech recognition to identify the second word or phrase;

verifying with the user whether the identified second word or phrase is correct; and associating the second word or phrase with the second control action in response to verifying that the identified second word or phrase is correct.

17. A non-transitory computer-readable medium having stored thereon a plurality of instructions which, when executed by at least one processor, cause the at least one processor to:

receive a selection of a first control action associated with a first application stored in a mobile device;

provide a plurality of choices associated with the first control action;

receive input that identifies a word or a phrase to be used as a voice command corresponding to the first control action, wherein the word or phrase is selected from the plurality of choices;

associate the identified word or phrase with the first control action;

receive voice input from a user;

identify the voice input as corresponding to the identified word or phrase; and perform the first control action associated with the first application based on the identified voice input.

18. The non-transitory computer-readable medium of claim 17, further including instructions for causing the at least one processor to:

display, in response to a user input, a plurality of control actions and voice commands corresponding to the plurality of control actions associated with the first application;

receive, from the user, a selection of a second one of the control actions;

receive text or second voice input, from the user, to change the voice command associated with the second control action, the received text or second voice input identifying a word or a phrase that will be used as the voice command corresponding to the second control action;

store the received text or voice input;

receive third voice input from the user;

identify the third voice input as the voice command corresponding to the second control action; and perform the second control action based on the identified third voice input.

19. The non-transitory computer-readable medium of claim 17, further including instructions for causing the at least one processor to:

allow a user to select a word or phrase corresponding to each of a plurality of control actions associated with the first application.

20. The non-transitory computer-readable medium of claim 17, wherein the first control action comprises at least one of taking a picture with a camera, activating a video record mode associated with a video recording device, setting a resolution mode, activating a flash, controlling a zoom lens or controlling an auto focus function.

21. A device, comprising:

means for receiving a selection of a first control action associated with an application stored in the device, means for providing a plurality of choices associated with the first control action, means for receiving a word or a phrase to use as a voice command corresponding to the first control action, wherein the word or phrase is selected from the plurality of choices, means for associating the word or phrase with the first control action, means for receiving voice input from a user, means for identifying the voice input as corresponding to the word or phrase, and means for performing the first control action based on the identified voice input.

22. The device of claim 21, further comprising:

memory means, and means for storing the received word or phrase in the memory means.

23. The device of claim 21, further comprising:

means for displaying, in response to an input from the user, a plurality of control actions associated with the application and voice commands associated with the plurality of control actions.

24. The device of claim 23, further comprising:

means for allowing the user to change voice commands associated with at least some of the plurality of control actions.

25. The device of claim 24, further comprising:

means for receiving, from the user, a second selection corresponding to the first control action, means for receiving, from the user, a voice input identifying a new word or phrase that will be used as a voice command corresponding to the first control action, and means for associating the new word or phrase with the first control action.

26. The device of claim 21, further comprising:

memory means;

means for allowing the user to provide at least one word corresponding to each of a plurality of control actions associated with the application, and means for storing the at least one word corresponding to each of the plurality of respective control actions in the memory means.

27. The device of claim 26, further comprising:

means for performing speech recognition to identify a second word or phrase, provided by the user, that is associated with a second one of the plurality of control actions, means for verifying with the user whether the identified second word or phrase is correct, and means for storing the identified second word or phrase in the memory means as corresponding to the second control action in response to verifying that the identified second word or phrase is correct.

28. The device of claim 21, further comprising:

memory means;

means for providing a user interface configured to allow the user to input text to the device, the text identifying at least one word or phrase that will correspond to a second control action associated with the application, and means for storing the text in the memory means as corresponding to the second control action.

* * * * *